Patented May 24, 1949

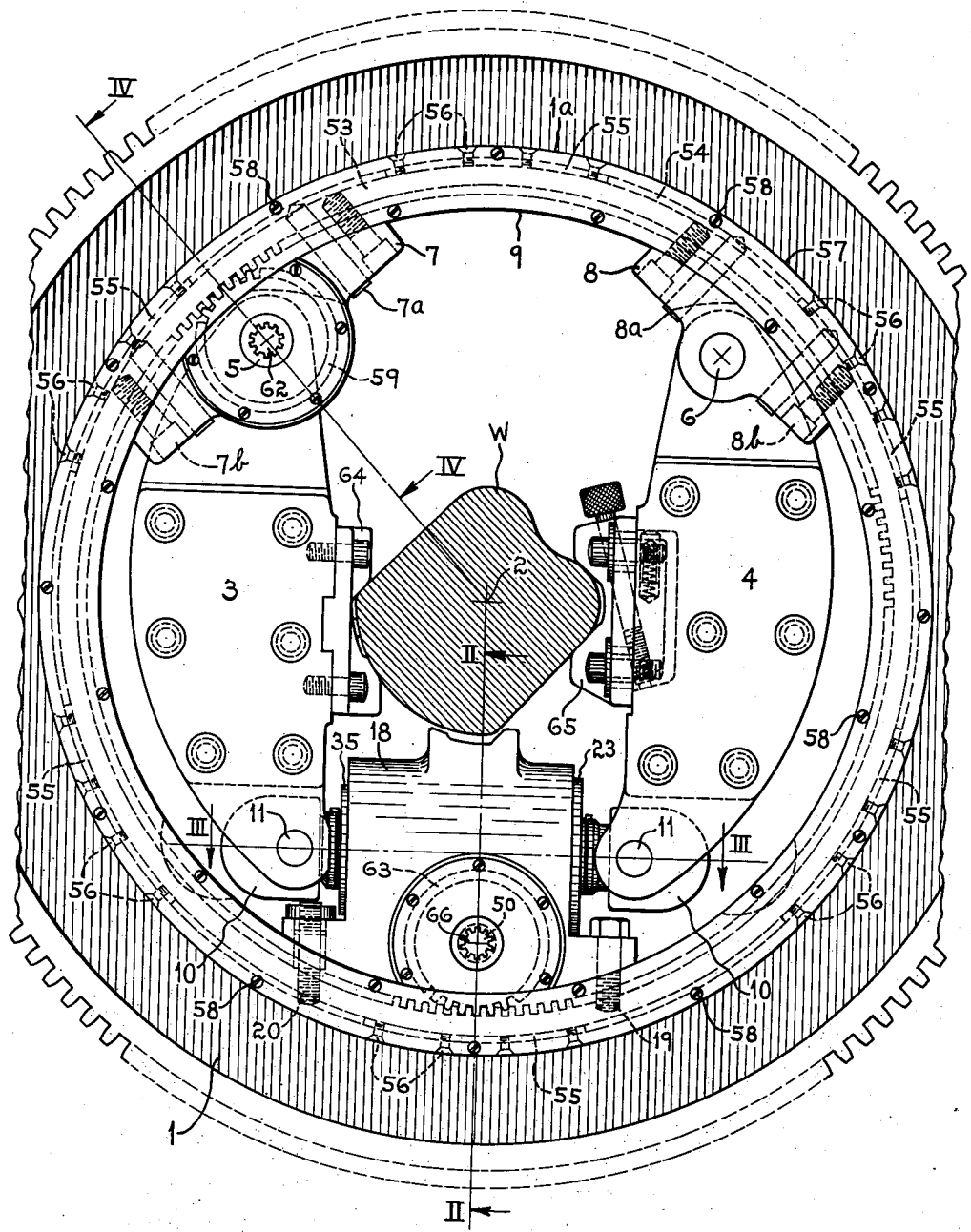
FIG. I
INVENTORS.
WALTER R. MEYER
AND HAROLD J. SIEKMANN
BY
ATTORNEYS.

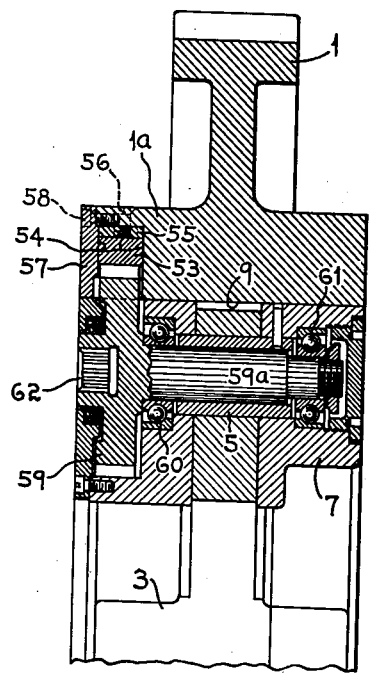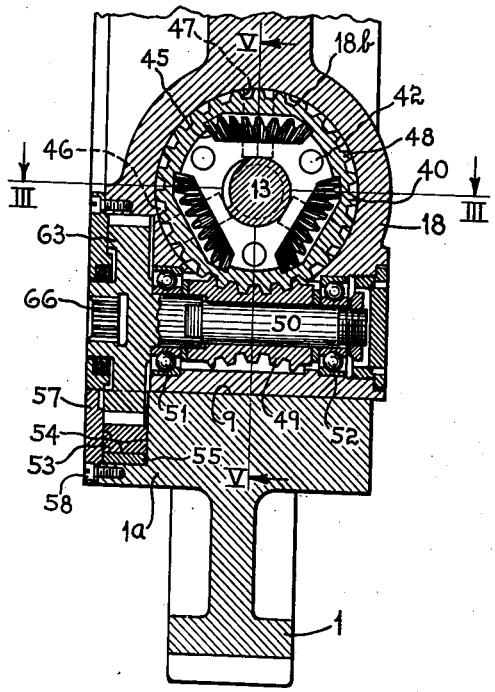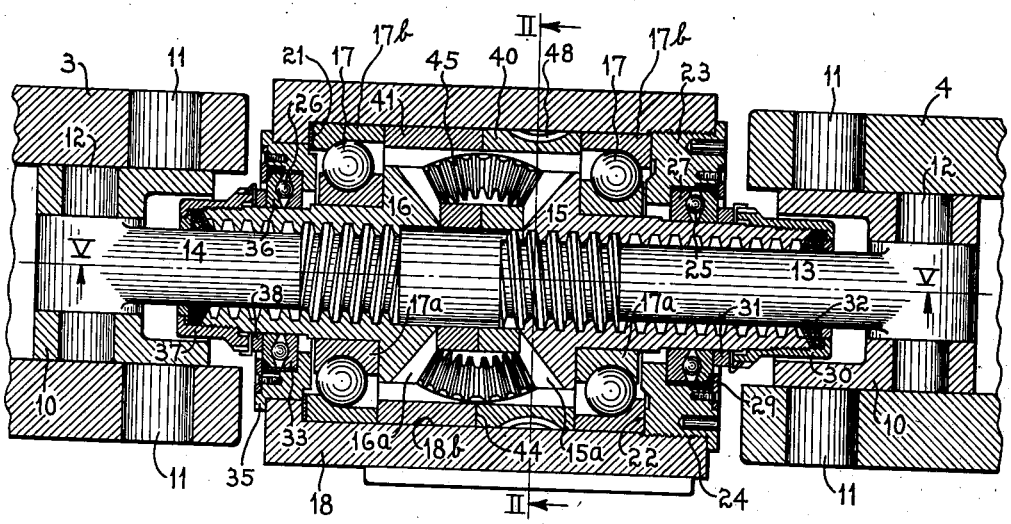

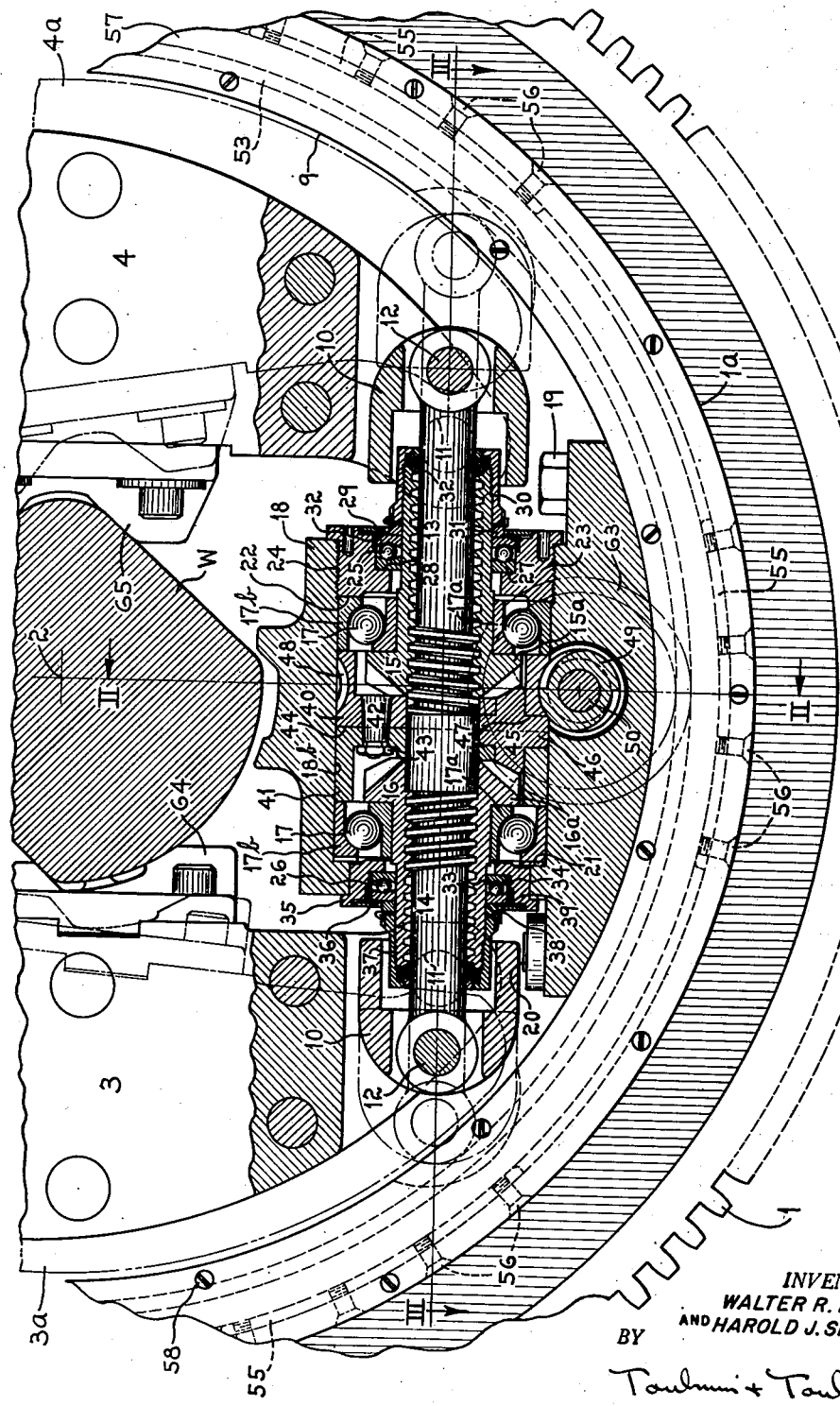

2,471,162

UNITED STATES PATENT OFFICE 2,471,162

CRANKSHAFT CHUCK

Walter R. Meyer and Harold J. Siekmann, Cincinnati, Ohio, assignors to The R. K. Le Blond Machine Tool Company, Cincinnati, Ohio, a corporation of Delaware Application October 27, 1945, Serial No. 624,970

3 Claims. (Cl. 82—40.)

This invention pertains to chucking mechanism for rough irregular work pieces to be machined in machine tools. More particularly, this invention pertains to a chuck for gripping a rough irregular prelocated work piece in a center drive lathe.

This invention is especially adapted to a double center drive crankshaft lathe of a character for example as shown in Patent No. 2,191,935 issued February 27, 1940. In such types of lathes the tool feeding devices or tool bars are mounted closely adjacent the side faces of the center drive work spindles so that access to the chucking and clamping devices in the center drive spindle is necessarily limited to particular segmental portions at each side of the spindle. This is especially true with respect to the tightening devices for clamping or unclamping the chucks relative to the work or crankshaft in the lathe.

It is frequently desirable to provide a power driven device for operating the clamping devices of the chuck which is located in the machine frame at a point remote from and inaccessible to normal operation of the chuck clamping mechanism. In such cases it is an object to provide additional manually operable means positioned on the chuck in another location exposed to manual operation in the event of failure of the power driven device.

It is also an object to provide an accessible clamp actuating device for a center drive chuck which allows the work spindle to be stopped in a position to facilitate the loading and unloading of the work in the lathe.

And a further object is to provide a clamp operating device in a center drive chuck which is remotely located relative to the clamp actuating mechanism of the chuck jaws.

And it is also an object to provide a clamp operating device for a center drive chuck which is located coaxially of one of the pivot pins of a swinging clamping jaw of the chuck.

It is furthermore an object of this invention to incorporate in a chuck of this character means for applying a power wrench which is conveniently placed and located in such a position so as not to interfere with the loading and unloading of work in the chuck.

And still another object is to provide a rotatable internal ring gear in the periphery of the center drive work spindle which connects the power operating means with that of the differential actuating mechanism for clamping jaws which grip the work piece.

Further features and advantages of this invention will appear in the following detailed description of the drawings in which:

Figure I is an end elevation of a center drive work spindle for a double center drive crankshaft lathe incorporating the features of this invention.

Figure II is an enlarged fragmentary vertical transverse section taken on the line II—II of Figures I and V.

Figure III is an enlarged fragmentary sectional view on the line III—III of Figures I, II, and V.

Figure IV is a vertical transverse section taken on the line IV—IV of Figure I and showing in particular the arrangement for applying power to cause rotation of the internal ring gear.

Figure V is an enlarged fragmentary sectional view taken on the line V—V of Figures II and III showing the chuck jaw or clamp actuating mechanism.

For illustrative purposes this invention is shown applied to one of the center drive work spindles of a double center drive crankshaft lathe of a character shown in Patent 2,191,935. The work spindle comprises the ring gear 1 associated with one of the center drive housings of the machine and is driven in any suitable manner such as outlined in the above mentioned patent. On a double center drive crankshaft lathe two such chucks are used, one for the flange end and the other for the stub end of the crankshaft. As both of these chucks are identical with the exception of the work contacting portions of the clamping jaws this invention is shown incorporated in just one of the center drive work spindles but it is understood this apparatus is readily adapted to both of the work spindles.

In this ring gear 1 is mounted the chucking or work gripping mechanism which is adapted to rigidly hold, support, and drive the crankshaft W by engaging its rough irregular webs while maintaining the shaft on the axis of rotation 2 of the lathe. The clamping arms 3 and 4 each are pivotally mounted on sleeve 5 and pin 6 carried in the segmental blocks 7 and 8. These blocks are securely fixed in the bore 9 of the work spindle ring gear 1 by suitable pins 7a and 8a and the screws 7b and 8b.

In the lower ends of the clamping arms 3 and 4 are pivotally mounted the crankshafts comprising webs 10 mounted on suitable line bearing trunnions 11 which are connected by means of the pins 12 to the clamping screws 13 and 14 which operate in the rotatable nuts 15 and 16 carried in the thrust bearings 17 in the bore 18b of the differential housing 18 fixed in the ring gear 1 by the screws 19 and the threaded studs 20. On each of these nuts 15 and 16 are formed the bevel gears 15a and 16a for rotating the respective nuts. Outward thrust in these nuts during the clamping of the work in the chuck takes place against the inner races 17a of the bearings 17. The outer races 17b are axially confined in the bore 18b by the shoulder 21 of the housing 18 and the face 22 of the bushing 23 threaded at 24 in this bore.

Inward thrust on these nuts 15 and 16 during unclamping of the work is taken care of by the thrust bearings 25 and 26, the bearing 25 having its inner race 27 bearing against the face 28 of the bushing 23 while its outer race 29 abuts against the adjusting nut 30 threaded to the nut 15 through the thrust collar 31. A suitable packing 32 carried in the bushing 23 precludes the escape of lubricant or entrance of any foreign matter in the mechanism in the bore 18b of the housing 18. Similarly the bearing 26 has its inner race 33 bearing against the face 34 of the bushing 35 fixed in the housing 18 while its outer race 36 abuts against the adjusting nut 37 threaded to the nut 16 through the thrust collar 38. A suitable packing 39 carried in the bushing 35 and engaging the outer race 36 of the bearing 26 precludes the escape of lubricant or the entrance of foreign matter into the bore 18b of the housing 18.

Journaled in the bore 18b of the housing 18 is the differential cage comprising the worm ring 40 and the plane ring 41 which are fixed together by tapered pins 42 and nuts 43. This cage is thus parted on the line 44 so that the bevel pinions 45 having trunnions 46 may be journaled in the bores 47 formed in this cage so that these bevel pinions 45 simultaneously engage the bevel gears 15a and 16a of the nuts 15 and 16. Thus rotation of the cage will cause one or the other or both of said nuts to be rotated with equal force. On the worm ring 40 is formed a worm wheel 48 which is engaged by the worm 49 fixed on the actuating shaft 50 journaled on bearings 51 and 52 in the housing 18.

For actuating this differential mechanism a large internal ring gear 53 is rotatably mounted in an annular slot 54 formed in the hub portion 1a about the periphery of the ring gear 1. A series of shoes 55 fixed in position by suitable screws 56 serve to form an appropriate bearing for the ring gear 53 to ride against while being rotated in the slot 54. The ring gear 53 is held in place by a ring shaped plate 57 which is securely fixed to the front face of the hub portion 1a of the ring gear 1 by suitable screws 58.

Associated with the ring gear 53 is the gear 59 formed integrally with the shaft 59a and which is journaled on bearings 60 and 61 in the segmental block 7 and passes loosely through the sleeve 5. The end portion of this gear 59 is provided with a suitable splined socket 62 into which may be inserted an appropriate wrench for rotating it for actuating the ring gear 53. A similar gear 63 is formed integrally with the worm shaft 50 of the differential housing 18 and is also in engagement with the ring gear 53.

Referring particularly to Figure I, it can be seen that when power is applied to the splined socket 62 causing the gear 59 to be rotated, the ring gear 53 will rotate in the slot 54 and in turn through the gear 63 causes the worm shaft 50 to be rotated thereby actuating the differential mechanism. As this differential mechanism is being actuated the clamping arms 3 and 4 are being moved from their normally open positions 3a and 4a to the position where the work engaging jaw 64 of the clamping arm 3 and the work engaging jaw 65 of the clamping arm 4 firmly grip the rough web of the crankshaft W without distorting it from correct position on the axis of rotation 2 of the lathe.

It might be noted that by use of this unique differential nut and screw mechanism, not only is this powerful fully equalized clamping effected without distorting the work but by this arrangement the clamping means is self-locking to automatically hold the clamping means positively in clamped position. This is accomplished by arranging the screws 13 and 14 and their nuts 15 and 16 with appropriate self-locking leads so that endwise pressure on these screws will not rotate these nuts. It is also to be noted that as a further precaution the worm 49 and worm wheel 48 are arranged to be self-locking so that the nuts 15 and 16 are locked against any rotation unless rotated by the worm actuating shaft 50. With this arrangement the chuck will rigidly hold the crankshaft until power is again applied to the socket 62 to return the clamping arms to their open positions for unloading the work from the chuck.

In a double center drive lathe it is necessary to use one of these chucks for the flange end and another for the stub end of a crankshaft but it is to be understood that our invention can be used with equal facility in a single center drive lathe requiring only one of such chucks.

In such lathes, it may frequently be desirable to utilize a power wrench or power actuating device for driving the differential chuck mechanism to clamp and unclamp the work in the lathe. When such apparatus is used, it is usually located in some portion of the machine frame and arranged to be engaged or disengaged with a socket portion of the chuck mechanism which is usually inaccessible to manual application of an operating wrench in the socket. In such an arrangement, the power wrench socket 66 would be formed in the gear 63 attached to the worm operating shaft 50.

Thus, an arrangement is provided having a power wrench socket 66 which may be engaged by a power chucking device to manipulate the chuck clamps and through the medium of the ring gear 53 and the gear 59 having the manual wrench socket 62 the chuck may be readily manipulated either manually or by a power wrench. This is desirable as it is frequently necessary to operate the chuck clamps manually in setting up the lathe and also in instances where there should be a power failure in the power wrench device for the chuck.

This arrangement also contemplates a plurality of operative points circumferentially disposed on the chuck body for operating the chuck mechanism from positions remote from one another either by manual or power actuation when the chuck is rotated in various different positions as when setting up the work initially in the lathe.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appended claims are intended to be included herein.

Having thus fully set forth and described this invention, what is claimed as new and desired to be secured by United States Letters Patent is:

1. In a center drive crankshaft chuck mounted in a center drive ring gear work spindle comprising a pair of clamping jaws pivotally mounted in the bore of said ring gear work spindle, means mounted in the bore of said ring gear work spindle for operating said jaws, an actuating shaft for said chuck operator, a gear on said shaft, and a wrench socket associated with said gear to effect rotation therein, a second gear coaxially journaled about a pivot of one of said clamping jaws, and common ring gear interconnecting means between said gears journaled in said center drive ring gear work spindle.

2. In a center drive crankshaft lathe chuck mechanism including a center drive ring gear having a bore, work engaging members pivotally mounted on said ring gear in said bore, actuating means for said work gripping members mounted on said ring gear and means for rendering said last-mentioned means operative comprising, a plurality of wrench socket shafts remotely located relative to each other and rotatably mounted on said ring gear at least one of said shafts being coaxially journaled with the axis of pivoting of one of said work gripping members, a gear associated with each of said wrench socket shafts, and a common ring gear journaled in said center drive gear coaxially therewith interconnecting both of said first-mentioned pair of gears.

3. A crankshaft chuck comprising, a rotary chuck body, a pair of swinging work engaging members pivotally mounted on said chuck body, differential actuating mechanism for swinging said work gripping members, and means for actuating said differential mechanism comprising a wrench socket shaft journaled in the chuck body, and another wrench socket shaft journaled in said chuck body at a circumferentially removed position from said first-mentioned shaft at least one of which is located coaxially with the axis of pivoting of one of said work gripping members, and a common interconnecting means in said chuck body for interconnecting both of said wrench socket shafts comprising a ring gear coaxially journaled in said chuck body with the axis of rotation thereof.

WALTER R. MEYER.
HAROLD J. SIEKMANN.

REFERENCES CITED

The following references are of record in the file of this patent:

UNITED STATES PATENTS

| Number | Name | Date |
|---|---|---|
| 1,939,147 | Snyder | Dec. 12, 1933 |
| 2,154,908 | Lewis | Apr. 18, 1939 |
| 2,247,550 | Groene | July 1, 1941 |
| 2,249,240 | Groene | July 15, 1941 |
| 2,250,634 | Groene | July 29, 1941 |